April 10, 1962     E. P. BULLARD III     3,028,768
TRANSMISSION AND CONTROL THEREFOR
Filed June 21, 1960     5 Sheets-Sheet 5

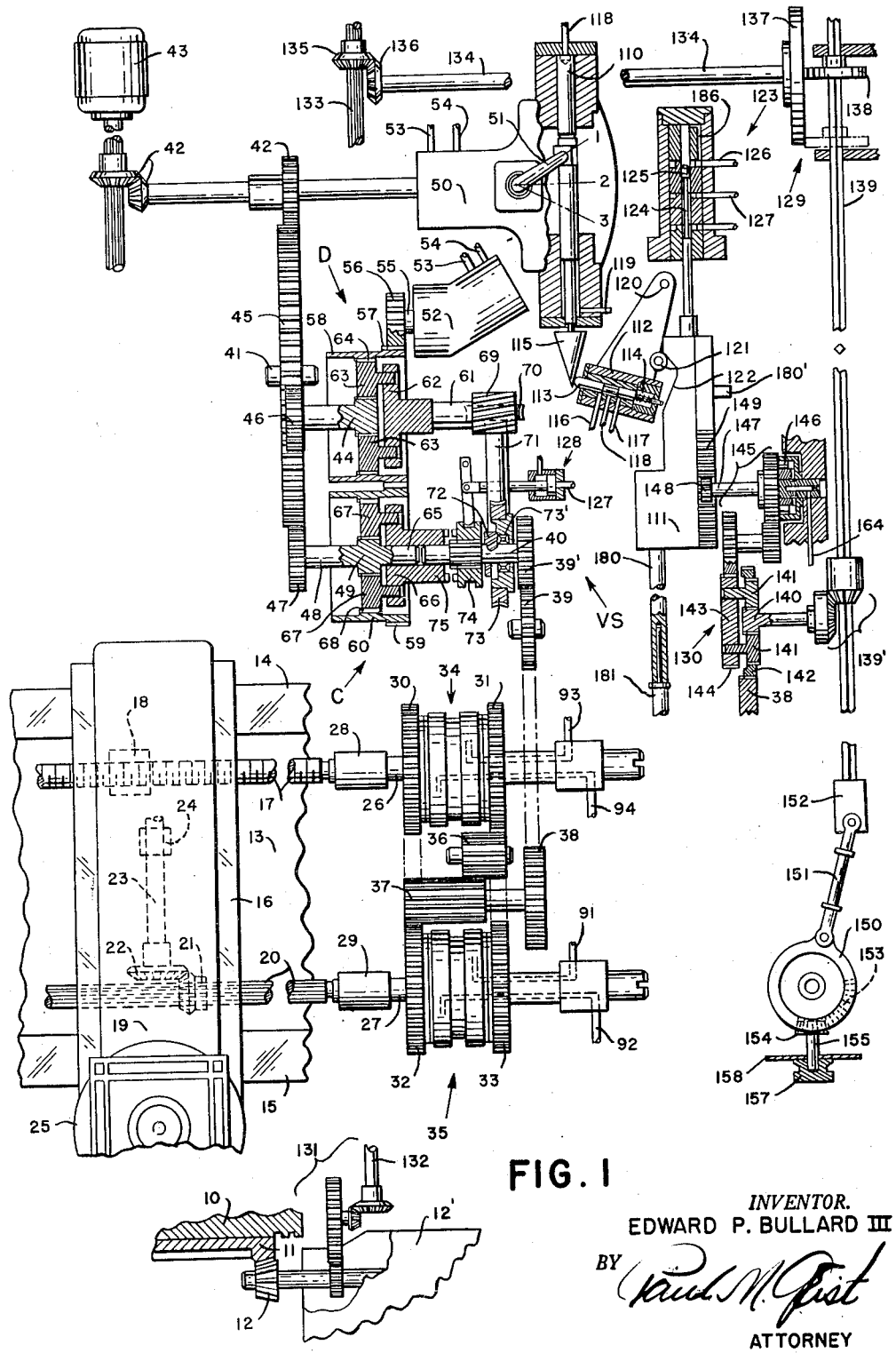
FIG. I
INVENTOR.
EDWARD P. BULLARD III

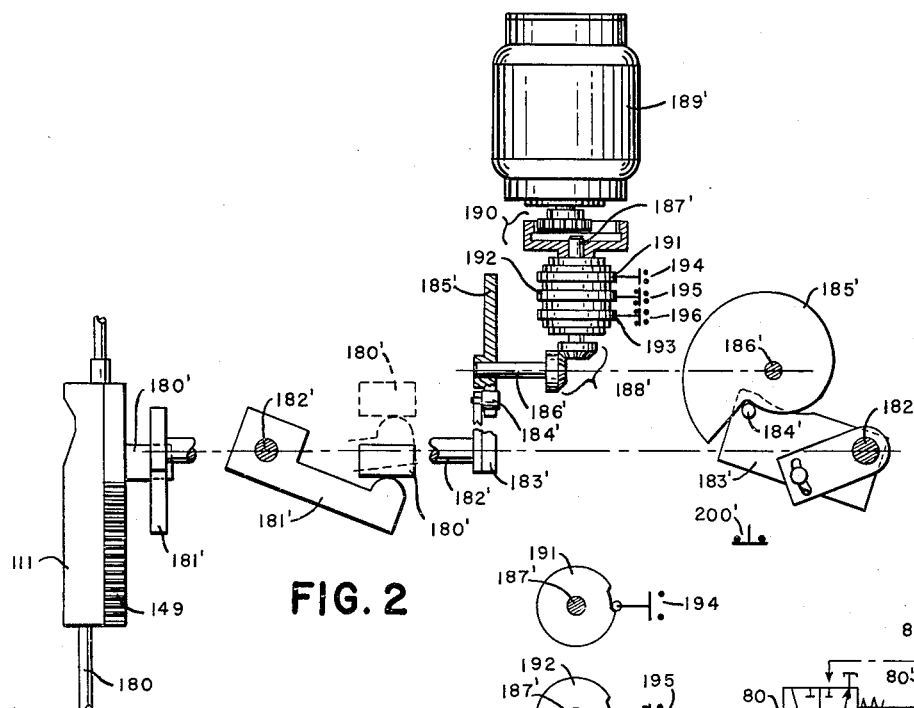
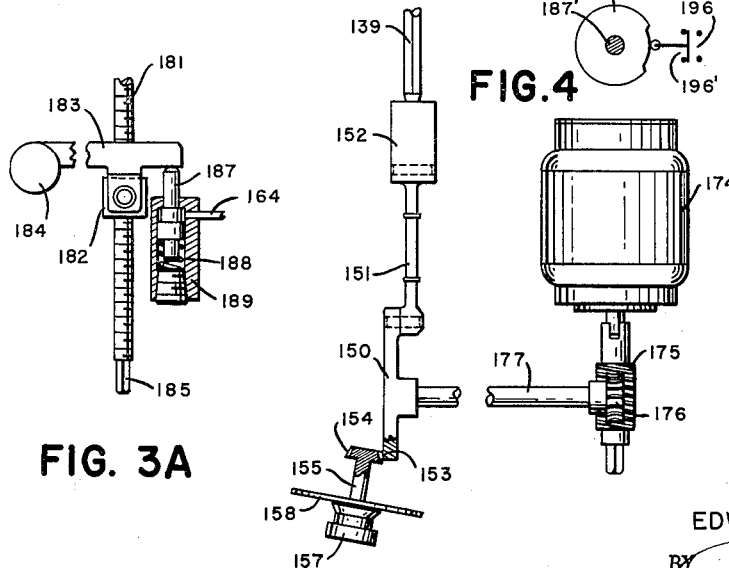
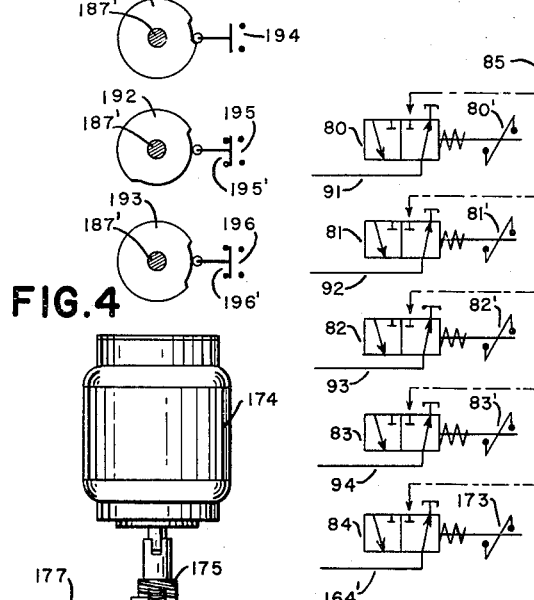

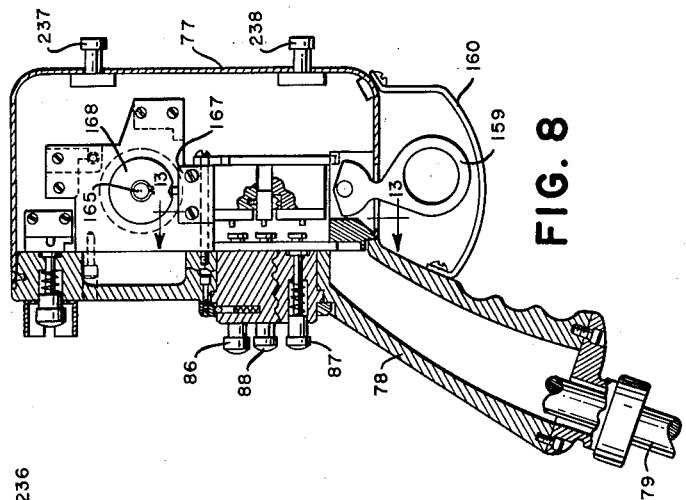
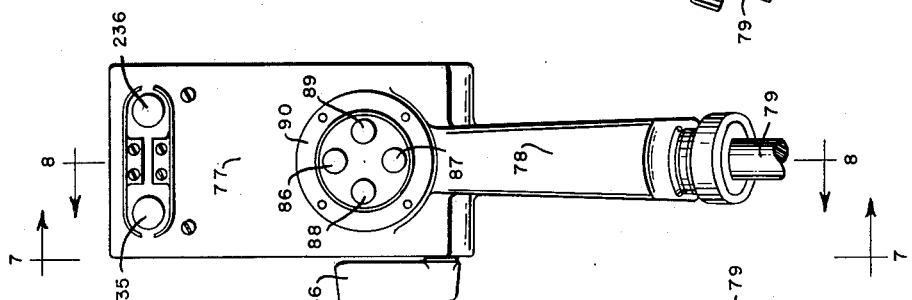
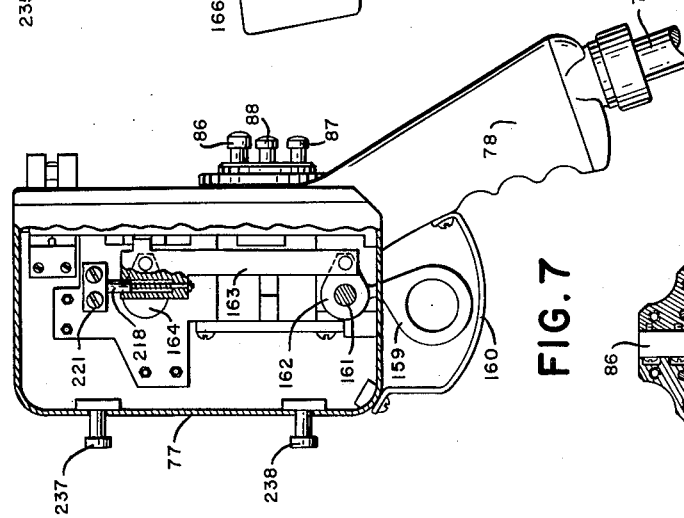
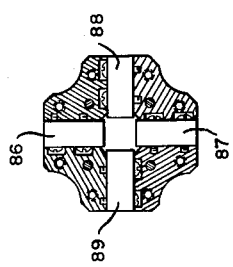

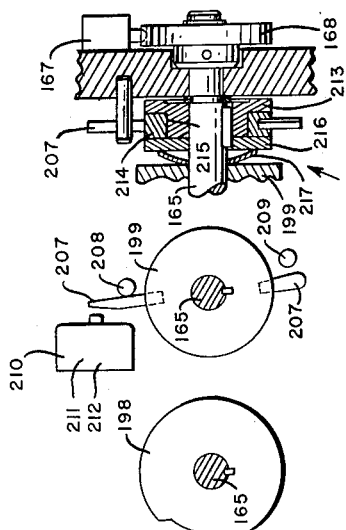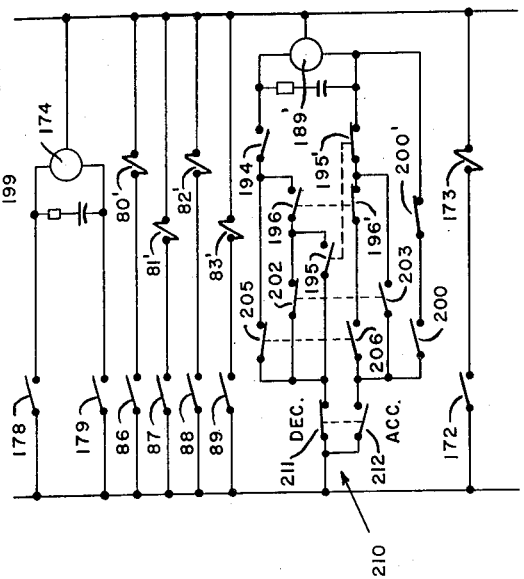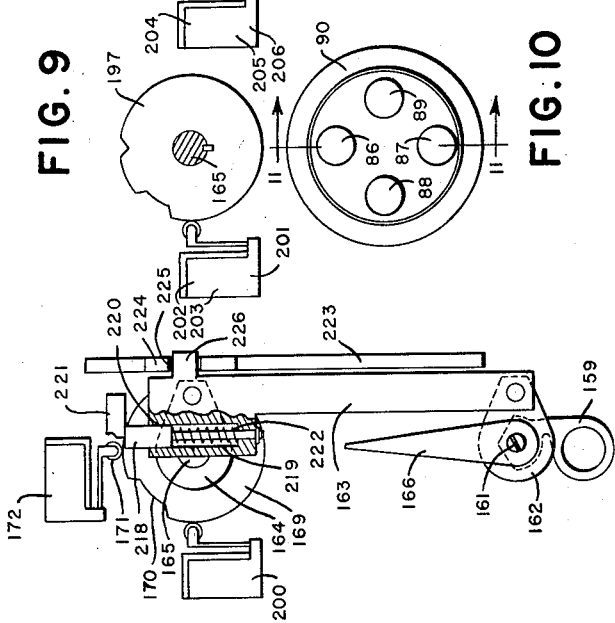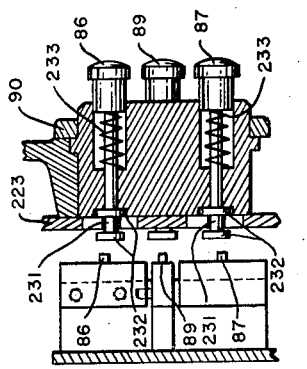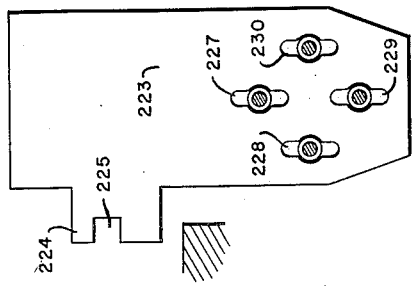

*INVENTOR.*
EDWARD P. BULLARD III

ATTORNEY 3,028,768
TRANSMISSION AND CONTROL THEREFOR
Edward P. Bullard III, Fairfield, Conn., assignor to The
Bullard Company, a corporation of Connecticut
Filed June 21, 1960, Ser. No. 37,677
21 Claims. (Cl. 74—675)

The present invention relates to variable speed transmissions, and particularly to a new and improved feedworks transmission for machine tools, and to a control therefor. This application relates to application Serial No. 775,307, filed November 20, 1958, now Patent No. 2,972,907, in the name of Edward P. Bullard III.

Heretofore, the common form of feedworks for a machine tool usually employed a plurality of feed speeds that were rendered effective through separate gearing combinations so that the power passing through the feedworks remained substantially constant for each of the plurality of feed rates. The power supplied to such feedworks usually is derived from a variable speed headstock transmission, the main function of which is to rotate a spindle to which work can be attached. In this way, the rate of feed is always related to the spindle speed and the feed rate is usually measured in fractions of inches per revolution of the spindle.

Many attempts have been made to provide steplessly variable feed rates for a movable machine tool member, but all have left much to be desired. Usually such attempts have included the use of a steplessly variable hydraulic system including a variable volume unit driving a constant displacement unit. Such systems produce constant torque output, and the range of low output speeds of the system occurs at the low speed range of the variable displacement unit. Both of these conditions adversely affect the low range of feeds of the movable member of the machine tool. The constant torque of such a system provides inadequate power throughout the range of operation of the system, and the low speed range of the variable displacement unit at low feed rates of the movable member is practically impossible to control accurately.

Furthermore, the use of such a hydraulic system is limited in that only one direction of rotation of the variable displacement unit can be employed. Consequently, to cover the entire range of feed and traverse rates of movement of the movable member of the machine tool, the variable displacement unit must operate at an uncontrollably slow rate of speed at the low feed rates where extreme accuracy is needed.

The principal object of this invention is to provide a plurality of variable speed transmissions that can be set to provide a predetermined ratio of rates of operation, and a control therefor that will maintain said ratio constant for any given adjustment of one transmission regardless of adjustments of another.

Another object of this invention is to provide a feedworks transmission in which separate and independently effective paths of power flow are employed, but arranged so that during the effectiveness of one, the other is conditioned preparatory to becoming effective.

Another object of this invention is to provide such a feedworks transmission in which epicyclic gearing arrangements are provided in plural paths of power flow.

Another object of this invention is to provide such a feedworks transmission in which epicyclic gearing arrangements are acted upon by an auxiliary variable speed device and in which ratio means is provided between the epicyclic gearing arrangements and the output shaft for causing the output shaft to rotate at the same speed through either epicyclic gearing arrangement at a point within the range of speed adjustment of the auxiliary variable speed device.

Another object of this invention is to provide a feedworks transmission that is capable of steplessly varying the feed and traverse rates of movement of a machine tool member from zero to any desired rate within the limits of the design.

Another object of this invention is to provide such a feedworks transmission capable of accurately controlling the feed rate in slow feeds.

Another object of this invention is to provide such a transmission capable of providing substantially constant horsepower throughout its range of steplessly variable feed and traverse rates.

Another object of this invention is to provide a steplessly variable feedworks transmission including hydromechanical components, and wherein the low feed rates of the machine tool member occur when the hydraulic components are rotating within a speed range providing maximum efficiency of the units.

A further object of the invention is to provide such a feedworks transmission capable of relating the feed rates thereof to the spindle speed of the machine tool so that accurate feeds per revolution of the spindle can be accomplished.

A still further object of the invention is to provide such a steplessly variable feedworks transmission in which the rapid traverse rates of movement of the machine tool member are unrelated to the speed of rotation of the machine tool spindle.

Another object of the invention is to provide a control for a variable speed transmission that can be carried in one hand of an operator and which contains means for controlling the direction, feed rate and duration of the motion of a movable member along intersecting paths of motion.

Still another object of the invention is to provide such a control having a pistol grip and a trigger-like element adapted to control the feed movement of the movable member when on one side of a neutral position, and to control the rate of traverse movement when at different positions on the other side of said neutral position.

One aspect of this invention may be to provide a feedworks transmission having two paths of power flow between its input and output shaft and in which paths may be located separate epicyclic gearing arrangements having the usual three power transmitting elements. One of the elements of each arrangement may be driven from the power input shaft of the feedworks, and a second element of each arrangement may be driven by an adjustable auxiliary variable speed device. The auxiliary variable speed device may be of any type so long as it is capable of being adjusted in two directions within its range of speed variations. It may or may not be reversible; it may or may not be a stepless type of variable speed device; it may or may not be of a hydraulic type of steplessly variable speed device; and it may be driven by the input shaft or by any external source of power. However, under certain conditions, if the auxiliary variable speed device is driven by an external source of power, a loss of feedback power may be experienced during a portion of the range of operation of the transmission, which otherwise could be employed to advantage.

In another aspect of the invention, the auxiliary variable speed device may be connected to the epicyclic gearing arrangements in such a manner as to cause a third element of one arrangement to increase in speed and a third element of the other arrangement to decrease in speed as the auxiliary variable speed device is operated in either of its directions of speed adjustment.

Ratio means may be provided between the output shaft and the third elements of the epicyclic arrangements which increase and decrease in speed as the auxiliary variable speed device is adjusted. In the embodiment disclosed, dissimilar ratio means are employed, and they may be such as to cause the output shaft to rotate at the same speed when one of the above-referred-to elements is rotating at a speed above the base speed of its arrangement and the other is rotating at a speed below the base speed of its arrangement.

Another aspect of the invention may be to provide means for transferring the flow of power to the output shaft from one of the third elements to the other third element when said third elements are, respectively, rotating above and below the base speed of their corresponding epicyclic arrangements, or when the auxiliary variable speed device is at one limit of its speed adjustment.

In another aspect of the invention, a control may be provided for the feedworks transmission which may be capable of selecting the direction and path of movement of the movable member of the machine tool as well as the rate of feed or traverse movement thereof, and which will, during any feed selection, definitely relate the feed to the rotation of the machine tool spindle. This control may include means for varying the displacement of the one hydraulic unit. The operation of the means may be effected by connecting one element of an epicyclic gearing arrangement to it, a second element thereof to the output of the feedworks, and a third element thereof to the output of a manually adjustable auxiliary variable speed system which is driven by means that drives the machine tool spindle. The construction may be such that upon manually setting, to a predetermined value, the variable speed system that is driven by the spindle drive, a differential speed will occur between its output and that of the feedworks, whereupon the one element of the last described epicyclic gearing arrangement will respond to this differential speed and adjust the variable displacement hydraulic unit to cause the feedworks to change its output speed so as to bring the second and third elements of the control epicyclic gearing arrangement into proper relation corresponding to the newly set condition of the spindle drive variable speed system.

In another aspect of the invention, a servomechanism may be provided in combination with a rack mechanism forming part of the control, and which may be operated independently of the spindle drive auxiliary variable speed system during rapid traverse movemnet of the machine tool member. This may be accomplished by disengaging a clutch between the control and the control epicyclic gearing arrangement when traverse speed of movement of the machine tool member is desired.

In still another aspect of the invention, a portable control may include a box-like housing to which is attached a piston grip for holding the housing in one hand of an operator. On the housing and directly above the back of the pistol grip, four push buttons may be arranged in a circle in convenient location relatively to the pistol grip so that the thumb of the operator's hand holding the pistol grip can depress any one or two adjacent push buttons to directionally control the movement of a movable member connected to the transmission under the influence of the portable control.

In still another aspect of the invention, a trigger-like element may be located in convenient position relatively to the pistol grip such that the index finger of the operator's hand holding the pistol grip control can be employed to move the trigger-like element in one direction from a neutral position to cause said member to move at a preselected feed rate, and to move the trigger-like element to a plurality of positions on the other side of the neutral position to control the rate of traverse motion of the movable member.

The above, other objects and novel features of the invention will become apparent from the following specification and accompanying drawings which are merely exemplary.

In the drawings:

FIG. 1 is a front elevational view of a portion of machine tool to which a schematic showing of the principles of the invention are applied;

FIG. 2 is a schematic view of certain of the components forming the control for the apparatus shown in FIG. 1;

FIG. 3 is a schematic view of certain other components forming the control for the apparatus shown in FIG. 1;

FIG. 3A is a detail of the control;

FIG. 4 is a showing of certain cam arrangements of the control;

FIG. 5 is a partial wiring diagram of a detail of the control;

FIG. 6 is an end view of the portable control box embodying certain of the principles of the invention;

FIG. 7 is a partial sectional view taken substantially along line 7—7 of FIG. 6;

FIG. 8 is a partial sectional view taken substantially along line 8—8 of FIG. 6;

FIG. 9 is an exploded view of certain of the elements contained within the portable control box of FIG. 6;

FIG. 10 is an enlarged view of the directional push button arrangement on the control box of FIG. 6;

FIG. 11 is a sectional view taken substantially along line 11—11 of FIG. 10;

FIG. 12 is a view of an interlocking plate employed within the control box of FIG. 6;

FIG. 13 is a sectional view taken substantially along line 13—13 of FIG. 8;

FIG. 14 is a wiring diagram of the electrical circuit for the control; and

Figure 15:
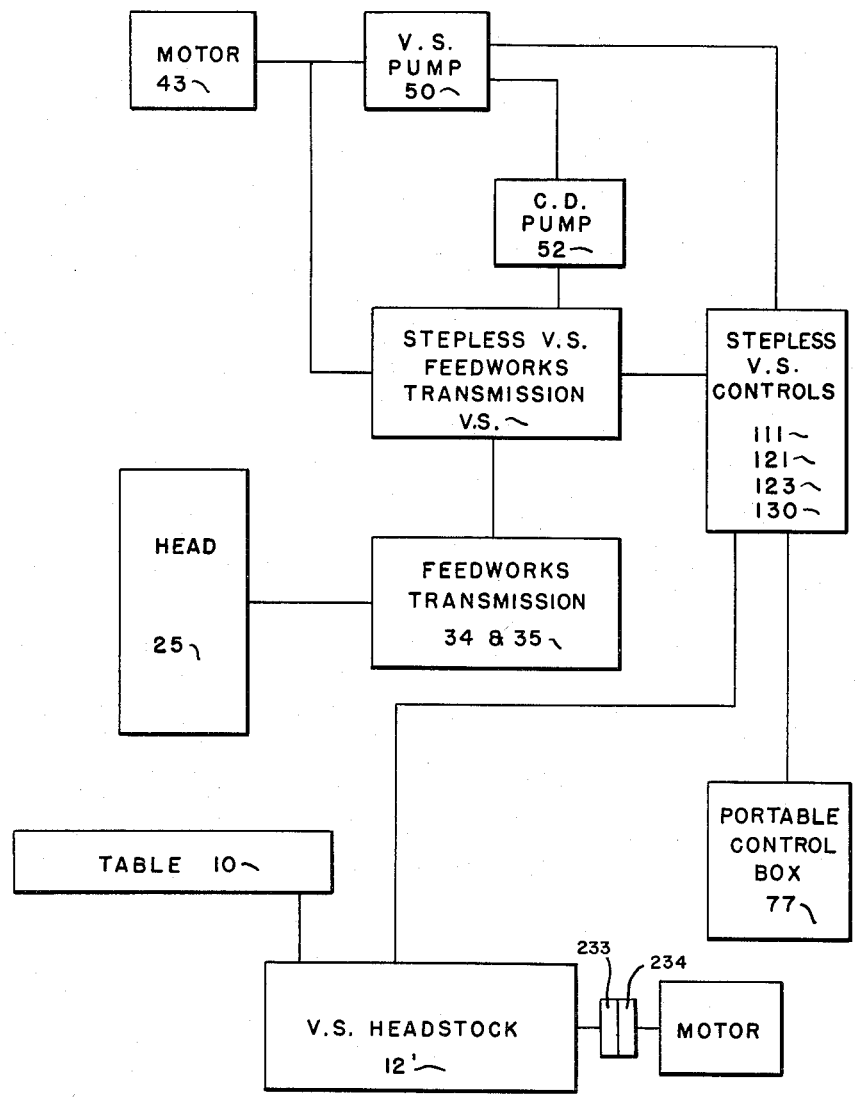
FIG. 15 is a block diagram of the various components of the present invention.

Referring to FIG. 1, the principles of the invention are shown as applied to a lathe, in which only those elements are shown that are necessary to an understanding of the invention. A work supporting table 10 may include a bevel gear 11 fixed to it that may be driven by a bevel pinion 12. The bevel pinion 12 may be driven at different rates of speed by variable speed means 12' which per se forms no part of this invention. This variable speed means may be of the conventional gear shifting type or otherwise. A base (not shown) may support the table 10 as well as a cross rail 13 in position relative to said table to permit one or more tool holders to be moved into engagement with work held on the table 10. The cross rail 13 may include ways 14, 15 along which a saddle 16 may be reciprocated by the rotation of a screw 17 that cooperates with a non-rotatable nut 18 fixed to the back of saddle 16. A tool slide 19 may be mounted on the saddle 16 for reciprocating movement along ways on saddle 16 at right angles to the ways 14, 15. This may be accomplished by the provision of a rotatable splined shaft 20 on which a bevel pinion 21 is splined. The pinion 21 may be mounted for rotation on, and within a cored-out portion of the saddle 16, and may mesh with a corresponding bevel pinion 22 that is likewise mounted for rotation on the saddle 16. The pinion 22 may be fixed to a rotatable screw 23 that is threaded into a nut 24 that is fixed to the slide 19. From the foregoing it is evident that rotation of screw 17 in both directions will cause reciprocation of saddle 16 and with it slide 19 along ways 14, 15 of cross rail 13. And, rotation of splined shaft 20 in both directions will cause reciprocation of slide 19 along a path at right angles to the ways 14 and 15. The slide 19 may support a tool holder 25 to which tools can be fixed for cooperation with work held on the table 10.

The rotation of screw 17 and splined shaft 20 in both directions may be effected by the transmission of power through a feed bracket including parallel shafts 26 and 27 that, respectively, may be connected to screw 17 and splined shaft 20 by couplings 28 and 29. The shafts 26 and 27 may support two gears each, 30, 31, 32 and 33, for free rotation. A fluid-operated clutch 34 may be located between gears 30 and 31 to selectively connect either to shaft 26; and, a similar clutch 35 may be located between gears 32 and 33 to selectively connect gears 32 and 33 to shaft 27.

A pair of elongated overlapping and intermeshing gears 36 and 37 may be mounted in such a manner relatively to gears 30, 31, 32 and 33 that gears 30 and 32 mesh with gear 37, while gears 31 and 33 may mesh with gear 36. Gears 30 and 33 are shown in a stretch-out, unmeshing position for clarity. From the foregoing it is evident that the rotation of gear 37 will cause gears 30 and 32 to rotate in the same direction, and by virtue of gear 36, will cause gears 31 and 33 to also rotate in the same direction but reversely relatively to the rotation of gears 30 and 32. Accordingly, shifting of clutch 34 between its limits of motion will cause rotation of screw 17 in both directions; and shifting of clutch 35 between its limits of motion will cause rotation of splined shaft 20 in both directions.

Power may be supplied to the gear 37 through gears 38 and 39, the latter of which may be connected to a gear 39' fixed to the output shaft 40 of a variable speed transmission VS.

Referring to FIG. 1, an input shaft 41 having a gear 45 fixed thereto may be connected by suitable means such as gearing 42 to a prime mover such, for example, as a constant speed A.C. motor 43. The input shaft 41 may be connected to a first element of an epicyclic gearing arrangement D located in one path of power flow. In the embodiment disclosed, the shaft 41 is shown as connected to a sun gear 44 through gearing 45 and 46, although it is evident that any one of the three power transmitting elements of the epicyclic gearing arrangement D could have been selected.

Spur gearing including gears 45 and 47 are shown as driving a shaft 48 from shaft 41 in the same direction as gear 46 is driven from shaft 41, although the direction of rotation of shaft 48 relative to gear 46 is immaterial as will be explained hereinafter. The shaft 48 is connected to a first element of another epicyclic gearing arrangement C located in another path of power flow. While the shaft 48 may be connected to any one of the three power transmitting elements of the arrangement C, it is shown as being connected to a sun gear 49 thereof.

The motor 43 is also connected directly to a positive displacement variable volume hydraulic unit 50, the variable displacement of which can be changed by the movement of a lever 51 between two limiting positions at which the unit 50 delivers liquid under pressure at maximum capacity in opposite directions of flow. When the lever 51 is at its midpoint of movement, no fluid is delivered by the unit 50.

The unit 50 may be of any positive displacement variable capacity type and it may be connected to a positive displacement non-variable hydraulic unit 52 within a closed circuit including lines 53 and 54. The unit 52 may be connected to a shaft 55 that supports a gear 56 in mesh with a gear 57 mounted on a second element 58 of the epicyclic gearing arrangement D. Gear 57 may mesh with a gear 59 on a second element 60 of the epicyclic gearing arrangement C.

From the foregoing it is evident that the hydraulic units 50 and 52 comprise a variable speed device that is connected to a second element of each of the epicyclic arrangements D and C. While a hydraulic steplessly variable speed device driven from the motor 43 has been disclosed, it is to be understood that the variable speed device need not be of the stepless variety, of the hydraulic type, nor be driven by the motor 43. It may comprise any form of variable speed device that can be adjusted in two directions throughout its range of speed variations. It may be driven by an external source of power, although when so driven, under certain circumstances a loss of feedback power is experienced which latter can be utilized to advantage to a certain degree and under certain conditions of operation when the variable speed device is driven from the input shaft 41.

The second elements 60 and 58 of the arrangements C and D are shown as being rotated in opposite directions, but this is only exemplary and not to be considered as a limitation. The only reservation is that rotation of the first and second elements of each of the arrangements C and D should be such that as the variable speed device 50, 52 is operated to increase or decrease in speed, the speed of rotation of the third power transmitting element of one of the arrangements C or D increases while the speed of the third element of the other decreases.

In the embodiment disclosed, the third element of the arrangement D may comprise a shaft 61 having an arm 62, to each of the outer ends of which a planet gear 63 is journaled. The planet gears 63, of course, mesh with the sun gear 44 as well as internal gear teeth 64 of the second element 58 of the arrangement D.

The third element of the C arrangement may comprise a shaft 65 similar to shaft 61 and having an arm 66 journaling planet gears 67 that mesh with the sun gear 49 and the internal gear teeth 68 on the second element 60.

Dissimilar ratio gearing may be provided between the shafts 61, 65 and the output shaft 40. This gearing may comprise worm 69 fixed to shaft 61 that meshes with a worm gear 70 fixed to a shaft 71; a worm 72 fixed to shaft 71 may mesh with a worm gear 73 mounted on shaft 40 with an overriding clutch 73' therebetween for a purpose to be described later. A clutch element 74 may be splined to shaft 40 and it may cooperate with clutch engaging means on a clutch element 75 fixed to shaft 65 in a manner presently to be described.

The hydraulic unit 50 is adapted to drive shaft 55 at a maximum speed in one direction at a 1:1 ratio, when its lever 51 is in the number 1 position, and to drive shaft 55 at a maximum speed in the opposite direction at a 1:1 ratio when lever 51 is in its number 3 position. When lever 51 is in its number 2 position, shaft 55 is not driven by unit 50. With the shaft 55 rotating at a maximum speed in either direction, the reactors 58 and 60 are rotating in opposite directions at maximum speed. Since the sun gears 44 and 49 are rotating in the same direction, it is evident that the shaft 61 or 65 of the epicyclic gearing arrangements D or C, the reactor of which is rotating oppositely to its sun gear, will rotate at a speed below base speed of its corresponding arrangement, while the other shaft of the two will be rotating at a speed above base speed. Assuming that the arrangement D is the one in which its reactor 58 rotates oppositely to its sun gear 44 when lever 51 is in its number 1 position, if the proper gear ratios and the proper speed of shaft 55 are employed, shaft 61 can be standing still when reactor 58 is rotating at the proper speed incident to lever 51 being in its number 1 position.

With clutch 74 in the position shown in FIG. 1, and moving lever 51 toward its number 2 position, the speed of shaft 40 will increase, through the action of overriding clutch 73', steplessly from zero to a speed coincident with the lever 51 arriving at its number 2 position where reactor 58 is stopped and shaft 61 is rotating at the base speed of the arrangement D. Continued movement of lever 51 toward its number 3 position causes reactor 58 to increase in speed from zero, but in a direction reversely to that in which it was rotating during the period when lever 51 was moved from its number 1 to its number 2 position. Expressed differently, reactor 58 now rotates in the direction of its sun gear 44. This, of course, causes shaft 61 and shaft 40 to increase in speed to a maximum for the transmission of power through the D epicyclic gearing arrangement.

When lever 51 is at its number 3 position, the reactor 60 is rotating in a direction opposite to its sun gear 49 and at a maximum speed so that shaft 65 is rotating at a speed below the base speed of the epicyclic gearing arrangement C. By employing the proper gear ratio between shaft 61 and shaft 40, the speed of shaft 65 can be slightly greater than the speed of shaft 40 when lever 51 is in its number 3 position so that clutch 74 can be shifted into engagement with clutch element 75 without tooth-on-tooth engagement, the overriding clutch permitting shaft 40 to be rotated at the slightly greater speed of shaft 65.

Movement of lever 51 from its number 3 position to its number 2 position causes reactor 60 to decrease in speed to a stopped condition and consequently causes a stepless increase in speed of shaft 65 and shaft 40. Movement of lever 51 to its number 1 position, of course, reverses the rotation of reactor 60 causing the speed of shafts 65 and 40 to continue to increase to the top limit of the epicyclic gearing arrangement C.

By employing a relatively high gear ratio between shaft 61 and shaft 40, and a direct connection between shaft 65 and shaft 40, during initial movement of lever 51 from its number 1 position to its number 3 position and with clutch 74 in neutral, the speed of shaft 40 can be steplessly varied over a relatively small range of speeds, i.e., speeds from 0 to about 23 r.p.m. And, during movement of lever 51 from its number 3 position to number 1 position with clutch 74 clutched to element 75, the speed of shaft 40 may be steplessly varied from 23 r.p.m. to about 950 r.p.m. Accordingly, the low range of 0 to 23 r.p.m. as well as the lower end of the high range may be utilized for feed movements of the tool, and the range of 0 to 950 r.p.m. may be utilized for traverse speeds of the tool. These speeds of shaft 40 are merely one example that results from the selection of certain gear ratios. It is, of course, understood that any desired low and high speed range can be achieved by the proper selection of gear ratios.

In order to operate the feedworks transmisison to cause movement of the tool support in either direction along either of its paths of motion and at any predetermined feed or traverse speed, a control for the feedworks is provided.

Referring to FIGS. 5 to 11, inclusive, and particularly to FIGS. 6, 7 and 8, the control may include a box-like housing 77 having a pistol grip 78 attached thereto and adapted to be held by one hand of an operator. A multi-conductor cable 79 may lead from the lower end of the grip 78 and it may extend to the housing (not shown) for the transmission including the clutches 34 and 35 (FIG. 1) in which may be included solenoid operated valves 80, 81, 82, 83 and 84. The valves 80 to 84, inclusive, may be provided with a common constant pressure line 85, and valves 80 to 83 may also be provided with solenoids 80' and 83', respectively.

Referring to FIG. 14, the solenoids 80' to 83' may be included in circuits including manually operable push button switches 86, 87, 88 and 89. Referring to FIGS. 6 to 8, the housing 77 may be provided with a plate 90 at the top of the grip 78 on which are mounted the four directional push button switches 86 to 89, inclusive. These push button switches may be arranged such that holding of the grip 78 in the one hand of the operator permits his thumb to be employed to depress any one or two adjacent push buttons 86 to 89 at will. The outlet lines 91, 92, 93 and 94 of the valves 80 to 83, inclusive, may lead to the hydraulic clutches 34 and 35 as shown in FIG. 1.

From the foregoing it is evident that depressing push button 86 will energize solenoid 80' (FIG. 14), thereby operating valve 80 (FIG. 5) causing pressure liquid to flow through line 91 and rendering effective gear 33 (FIG. 1) to cause head 25 to move upwardly. Additionally, and in the same way, depressing buttons 87, 88 and 89 will cause head 25 to move downwardly, leftwardly and rightwardly, respectively. Additionally, pressing any two adjacent push buttons 86, 87, 88 and 89 will cause the head 25 to move simultaneously along the two paths corresponding to the buttons pushed with the resultant movement of head 25 along a 45° path between the two paths corresponding to the buttons pushed.

Referring to FIG. 1, in order to control the flow of power through the variable speed transmission VS, means may be provided for moving the lever 51 between its various positions. In the embodiment disclosed, this means may comprise a reciprocable piston 110 that is connected to the lever 51. The movement of piston 110 may be effected by a servomechanism including a reciprocable cam 111 and a servo valve 112. The servo valve may include a spool 113 that is resiliently urged by a spring 114 into engagement with a cam 115 fixed to one end of piston 110. Constant pressure and exhaust lines 116 and 117 are connected to the valve 112 such that the spool 113 blocks both when in its normal position or the position to which it returns after being displaced. Another line 118 is connected to valve 112 between the lines 116 and 117. Line 118 leads to the top of piston 110. A constant pressure line 119 continuously acts on piston 110 tending to return it to the position shown in FIG. 1; however, the area of piston 110 acted upon by pressure fluid from line 119 is less than that acted upon by pressure fluid from line 118 so that the latter overcomes the former when it is effective.

The valve 112 may be pivotally mounted at 120 and it may include a cam roller 121 that follows a cam surface 122 on cam 111. With the parts in the condition shown in FIG. 1, the lever 51 is in its number 1 position, and the units 50 and 52 are rotating at maximum speed in one direction. Movement of the cam 111 upwardly will cause the valve 112 to pivot counterclockwise about pivot 120 by the action of spring 114 expanding. This causes spool 113 to move leftwardly, establishing communication between lines 116 and 118 while maintaining exhaust line 117 closed. Accordingly, pressure liquid in line 118 forces piston 110 downwardly, moving arm 51 from its number 1 position toward its number 2 position until cam 115 forces spool 113 rightwardly to cut off communication between lines 116 and 118, at which point the pressure liquid within line 118 and above piston 110 is trapped, holding piston 110 and arm 51 in its new position.

As previously described, this causes the speed of the reactor 58 to decrease and that of the shaft 40 to increase from zero. Further upward movement of cam 111 causes the arm 51 to be moved downwardly through its number 2 position, thence to its number 3 position, at which point the follower roll 121 is at the low point of cam path 122 and the reactor 58 is rotating in a reverse direction at maximum speed. It is at this point that, due to the reduction gearing 69, 70, 72 and 73, shaft 40 has increased in speed from zero through its low speed range, and reactor 60 is conditioned to take over for the high speed range of operation of shaft 40. The arrangement is such that arm 66 is rotating at a speed slightly greater than that of shaft 40 so that clutch 74 can be shifted without tooth-on-tooth contact. Shifting of clutch 74 at the proper time is accomplished by a valve 123 having a valve stem 124 connected to the cam 111. When cam 111 is at a position in its upward travel such that the roll 121 is at the low point of cam surface 122, the head 125 of stem 124 establishes communication between lines 126 and 127, whereupon piston device 128 shifts clutch 74 into engagement with arm 75. Immediately, the faster rotating arm 75 takes over from the gear 73 because of the overriding clutch 73'.

Further upward movement of the cam 111 causes the roller 121 and valve 112 to move clockwise about pivot 120, thereby forcing spool 113 rightwardly, establishing communication between lines 118 and exhaust line 117, while still retaining line 116 blocked off. Accordingly, piston 110 begins to rise due to the pressure liquid in line 119 until cam 115 permits spool 113 to move leftwardly enough to close off exhaust line 117. This action of moving cam 111 upwardly may continue until arm 51 has returned to its number 1 position when shaft 40 is rotating at its maximum rate of speed.

Movement of the cam 111 downwardly from its uppermost position causes the shaft 40 to reduce in speed to zero when cam follower 121 is in the position shown in FIG. 1.

The reciprocation of the cam 111 during a metal removal operation of head 25 preferably should be related to the speed at which the table 10 is rotated by the conventional variable speed transmission 12'. During traverse movement of head 25, the movement of cam 111 should preferably be unrelated to the rotation of table 10. In the present embodiment, the function of relating head movement to table rotation has been accomplished by employing a servo drive between the gear 38 and an auxiliary variable speed device 129 that is driven from the transmission 12' that drives the table 10. The servo drive includes an epicyclic gearing train 130, cam 111, valve 112 and cam 115.

The output shaft of the conventional variable speed transmission 12' drives a gear train 131 that in turn drives a shaft 132. The shaft 132 is connected to a shaft 133 that drives a shaft 134 through bevel gears 135 and 136. A flat disc 137 is fixed to shaft 134, and it frictionally drives a disc 138 that is fixed to a reciprocable shaft 139 having a square or splined cross section. With disc 138 in its solid line position at the center of disc 137, shaft 139 does not rotate. Movement of disc 138 toward its dot-and-dash position increases the speed of rotation of shaft 139 from zero to a maximum predetermined value.

The speed of rotation of shaft 139 is employed to drive, through bevel gearing 139', a sun gear 140 of the epicyclic gearing arrangement 130. The sun gear 140 meshes with planet gears 141 which in turn mesh with the internal teeth of a ring gear 142. The external teeth of ring gear 142 mesh with gear 38 that is driven from the output shaft 40 of the variable speed unit VS. The planets 141 are journaled in an arm 143 that drives through gear teeth 144 thereon, a gear train 145 including a hydraulically operable clutch 146. When the clutch 146 is effective, gearing 145 drives a shaft 147 to which is fixed a pinion 148 in mesh with a rack 149 integral with the cam 111.

With the parts in the condition shown in FIG. 1, the gear 38 is not rotating, nor is shaft 139. Movement of disc 138 off its center position causes shaft 139 to rotate at a predetermined speed depending upon the distance that disc 138 is moved from center. Since gear 38 is not rotating, the rotation of sun gear 140 rotates arm 143 and hence shaft 147, provided, of course, that clutch 146 is effective. Rotation of shaft 147 may move cam 111 upwardly, thereby effecting the movement of lever 51 from its number 1 toward its number 2 position and hence starting the rotation of gear 38. When the speed of rotation of gear 38 arrives at a predetermined value, it will combine with the speed of rotation of the sun gear 140 and stop the rotation of arm 143. This, of course, stops the movement of cam 111 and also the movement of lever 51. By properly calibrating the offset positions of disc 138 with respect to the speeds of rotation of gear 38, such positions can represent definite feed rates of movement of the head 25, each of which rates will be definitely related to the speed of rotation of the table 10.

Reciprocation of shaft 139 may be effected by connecting it to an oscillatable member 150 through a connecting rod 151 and a non-rotatable connector 152 that permits rotation of shaft 139. The member 150 may be provided with bevel gear teeth 153 that mesh with a bevel pinion 154 on a shaft 155 to which is fixed a knob 157 and a dial 158. The dial 158 may be marked to indicate the feed rates corresponding to the calibrated offset positions of disc 138.

From the foregoing it is evident that setting of dial 158 will cause head 25 to move at a predetermined feed rate related to the rotation of the table 10 when the clutch 146 is rendered effective.

Referring to FIGS. 6 to 9, and particularly to FIGS. 7 and 9, the box-like housing 77 may include a trigger-like element 159 which may extend from within housing 77 outwardly from the bottom thereof and about which lower end may extend a guard 160. The trigger 159 may be fixed to a rotatably mounted shaft 161 mounted within housing 77. Also fixed to shaft 161 may be an arm 162 that may be pivotally connected to a vertically disposed rod 163 within housing 77. The upper end of the rod 163 may be pivotally connected to another arm 164 that may be fixed to a cam shaft 165 for a purpose to be described later. An operating lever 166 may also be connected to shaft 161 and may be located on the outside of the housing 77 to supplement the operation of trigger 159. The trigger 159 is held in a neutral position by a spring pressed detent 167 that cooperates with a cam stop 168. Movement of the trigger 159 clockwise from the neutral position (FIG. 9) moves the bar 163 downwardly, thereby rotating a cam 169 fixed to shaft 165. When a notch 170 on cam 169 receives a switch actuator 171 of a normally open switch 172, the latter closes, energizing a solenoid 173 (FIGS. 5 and 14). Energizing solenoid 173 actuates valve 84 to cause pressure fluid to flow to clutch 146 thereby rendering effective the drive between the servo and the cam 111.

Referring to FIG. 3, a reversing electric motor 174 may have a worm 175 fixed to its output shaft which meshes with a worm gear 176 fixed to a shaft 177 that is drivingly connected to the gear segment 150. Contacts 178 and 179 (FIG. 14) may be provided for energizing motor 174 in a forward or a reverse direction. These contacts 178 and 179 may be mounted in any convenient place so that the operator may view the dial 158 when either of the switches 178 and 179 is closed. When the desired feed rate has been reached, as evidenced by the reading of the dial 158, the contact 178 or 179 is released.

From the foregoing it is evident that changing the feed rate when the trigger 159 is in neutral merely causes the gearing 145 (FIG. 1) to rotate until clutch 146 is rendered effective by switch 172 (FIG. 14) closing, which occurs when trigger 159 is moved clockwise from its neutral position.

As previously explained, movement of the head 25 at traverse rates of speed preferably should not be related to the rotation of the table 10. In the embodiment disclosed, this has been accomplished by providing a separate power operated drive for moving the cam 111 independently of the epicyclic control gearing 130. Referring to FIGS. 1, 2 and 3, a member 180 may be fixed to the cam 111 and it may make a telescopic connection with a rod 181. The rod 181 may be threadingly connected to a nut 182 which is pivotally mounted on a lever 183, which latter is pivotally mounted at 184. The threaded rod 181 may include a square end 185 to receive a wrench.

Referring again to FIG. 1, the constant pressure inlet 126 of valve 123 may include a passage 186 that causes the constant pressure liquid to act on the head 125 of the stem 124 constantly urging cam 111 and rod 181 downwardly. The downward extent of movement of the rod 181 is determined by a piston 187 (FIG. 3A) that is urged upwardly into a predetermined position by a spring 188 within a cylinder 189.

From the foregoing it is evident that adjustment of the rod 181 can be made to produce a limiting downward position of the cam 111 to provide a predetermined "creep" speed of movement for the head 25. This "creep" speed is effective at the neutral postion of the trigger 159; however, unless one of the push buttons 86 to 89 is depressed, head 25 will not move. When any feed movement of head 25 is initiated, liquid pressure in a line 164' leading to the cylinder 189 withdraws piston 187 from its upper limiting position. This makes it possible to have a feed rate that is less than the predetermined "creep" rate.

Referring again to FIG. 2, the cam 111 may be provided with an abutment 180' adapted to be engaged by a finger 181' fixed to a shaft 182'. The shaft 182' may also support in fixed relation thereto another finger 183' having a cam follower 184' thereon. The follower 184' may engage the peripheral surface of a cam 185' that is fixed to a shaft 186'. The constant pressure acting on valve stem 124 (FIG. 1) forcing cam 111 downwardly causes follower 184' (FIG. 2) to remain in contact with the surface of cam 185'. Shaft 186' may be geared to a cam shaft 187' through bevel gearing 188', and cam shaft 187' may be driven by a reversible electric motor 189' through a gear reduction 190. Cams 191, 192 and 193 may be fixed to cam shaft 187' for actuating contacts 194, 195 and 196 for a purpose to be described later.

Referring to FIG. 9, the cam shaft 165 may have fixed to it, besides cam 169, cams 197, 198 and 199. The cam 169 not only operates feed switch 172, but also a switch 200 (see also FIG. 14). Cam 197 may actuate a switch 201 having normally closed and open contacts 202, 203 (FIG. 14). Cam 198 may actuate a switch 204 having normally closed and open contacts 205, 206. And, cam 199 may include a lever 207 that is frictionally driven between stops 208, 209 and adapted to actuate a switch 210 having normally closed and open contacts 211, 212.

The cam 199 may include a disc 213 keyed to shaft 165 and journalingly supporting a ring 214 on a shoulder 215 thereof. A disc 216 slidably keyed to shaft 165 may be urged toward ring 214 by a disc spring 217. The construction is such that rotation of shaft 165 in a counterclockwise direction will frictionally drive lever 207 into contact with switch 210 to operate it, and then engage stop 209 to cause the ring 214 to slip on shoulder 215. And, upon rotation of shaft 165 in a clockwise direction, lever 207 engages stop 208 a very slight distance away from switch 210. In this way, any movement of shaft 165 in either direction will almost instantly operate the contacts 211 and 212 for a purpose to be described later.

With the parts in the position shown in FIGS. 4, 9 and 14, and assuming that a directional push button 86 to 89 has been depressed, the head 25 will be moving at "creep" speed. Movement of the trigger 159 in a counterclockwise direction causes cam shaft 165 to rotate in a counterclockwise direction, thereby actuating switch 210 and closing contacts 212 while opening contacts 211 thereof. When cam shaft 165 has rotated approximately 10°, switch 204 is actuated to open contacts 205 and close contacts 206 (FIG. 14). This energizes motor 189' in a forward direction, causing cam shaft 187' to rotate in a counterclockwise direction (FIG. 4). Immediately, contacts 194 close but the reversing circuit for motor 189' is not completed because contact 211 is open. Rotation of cam shaft 187' causes cam 185' to rotate shaft 182' and consequently causes finger 181' to act on abutment 180' that is fixed to cam 111. This moves cam 111 upwardly, thereby increasing the speed of travel of head 25 as previously described. This upward movement of cam 111 continues until cam 193 on cam shaft 187' closes contacts 196 and opens contacts 196'. Closing contacts 196 does not complete a circuit because switch 211 is open. Opening contacts 196' stops motor 189', and the head 25 continues to move in the selected direction and at the traverse rate corresponding to the position of cam 111 relatively to the stopping of motor 189'.

Continued counterclockwise movement of trigger 159 for about eight additional degrees causes operation of switch 201, thereby closing contacts 203 and opening contacts 202. Closing contacts 203 re-energizes motor 189' in a forward direction, causing cam shaft 187' to rotate in a counterclockwise direction. This causes cam 185' to move cam 111 farther upwardly, thereby increasing the traverse speed of head 25 in the selected direction. The speed of head 25 increases until cam 192 opens contacts 195' and closes contacts 195. Closing contacts 195 fails to set up a complete circuit since contacts 211 are still open. Opening contacts 195' de-energizes motor 189', whereupon the head 25 moves at the traverse rate corresponding to the position of cam 111 as represented by the position of cam 192.

Continued counterclockwise motion of trigger 159 for about another eight additional degrees causes operation of switch 200. This causes re-energization of motor 189' through normally closed contacts 200'. Accordingly, cam shaft 187' begins to rotate again in a counterclockwise direction, causing cam 185' to move cam 111 still further upwardly, thereby increasing the traverse speed of head 25. Cam 185' in its rotation moves finger 183' (FIG. 2) counterclockwise, and when the speed of head 25 arrives at its maximum designed value, finger 183' opens normally closed switch 200' thereby de-energizing motor 189'. Accordingly, the head 25 continues to traverse at maximum speed while trigger 159 is held in its furthest counterclockwise position.

In order to provide an increasing resistance to the movement of trigger 159 in a counterclockwise direction, a spring pressed detent 218 (FIG. 9) may be mounted within cylinder 219 formed within a boss 220 integral with the bar 163. The detent 218 may engage a fixed abutment 221 such that as bar 163 moves upwardly, the detent 218 is forced downwardly against the action of a spring 222.

Upon releasing the force holding trigger 159 in its furthest counterclockwise position, the spring pressed detent 218 will cause it and cam shaft 165 to move in a clockwise direction. Immediately, switch 210 is operated by lever 207 moving in a clockwise direction, thereby closing contacts 211 and opening contacts 212. It will be recalled that contacts 194, 195 and 196 were all closed during the increasing traverse speed of head 25. Accordingly, motor 189' is energized and caused to rotate reversely, thereby rotating cam shaft 187' in a clockwise direction (FIG. 4). As cam shaft 187' rotates in a clockwise direction, cam 185' rotates in a clockwise direction, thereby permitting cam 111 to descend, causing a decrease in the rate of traverse movement of the head 25. This continues until cam 192 closes contacts 195' and opens contacts 195. Closing contacts 195' does not establish a circuit because contacts 212 are open. Opening contacts 195 de-energizes motor 189' and head 25 continues to travel at the traverse rate corresponding to the position of cam 111 when motor 189' stops.

Continued movement of trigger 159 toward neutral for about eight additional degrees causes the switch 201 to be operated to close contacts 202 and open contacts 203. Closing contacts 202 re-energizes motor 189' in the reverse direction to cause cam 185' to further reduce the traverse speed of head 25 until cam 193 opens contacts 196 and closes contacts 196'. Closing contacts 196' does not establish a circuit because contacts 212 are still open. Opening contacts 196 de-energizes motor 189' and head 25 continues to traverse at the speed corresponding to the position of cam 111 when motor 189' stops.

Further clockwise movement of trigger 159 toward neutral, of about another eight degrees, operates switch 204 to close contacts 205 and open contacts 206. Closing contacts 205 re-energizes motor 189', thereby effecting the further clockwise movement of cam 185' until cam 111 has descended to a point where lever 183 engages piston 187. At this point, head 25 is moving at "creep" speed and cam 191 opens contacts 194, thereby de-energizing motor 189'. Head 25 would continue to move at "creep" speed but for the release of the directional switch 86 to 89 that had been selected.

Referring to FIGS. 9, 11 and 12, an interlocking plate 223 may be slidingly mounted within the housing 77. Plate 223 may include a notched portion 224, the notch 225 of which is adapted to receive a tongue 226 fixed to reciprocable bar 163. Accordingly, as the trigger 159 is moved to either side of its neutral position, the bar 163 and plate 223 will be reciprocated. The plate 223 may include four elongated slots 227, 228, 229 and 230 having centrally located circular holes in each. Referring to FIG. 11, the push button portions of the switches 86 to 89 may include spool-like ends 231, the flanges 232 of which are capable of passing through the circular holes of the slots 227 to 230. Springs 233 normally urge the push button portions of switches 86 to 89 away from their corresponding switch actuating plungers. When trigger 159 is in its neutral position, the circular holes in slots 227 to 230 are aligned with the spools 231 of the push button portions of switches 86 to 89. Accordingly, pushing any one or two adjacent of these push button portions will energize clutches to cause head 25 to move along a desired path when trigger 159 is moved from its neutral position. This movement of trigger 159, of course, moves plate 223 so that the slots 227 to 230 cooperate with the stem or stems of the spools 231, thereby preventing changing of direction of head movement until trigger 159 is returned to neutral. Furthermore, as the trigger 159 approaches neutral, at the end of a traverse operation, the head moves at "creep" speed until neutral position of trigger 159 is effected when plate 223 automatically releases any and all of the push button portions of switches 86 to 89.

Referring to FIG. 15, solenoid controlled clutch and brake units 233 and 234 may be provided between the variable speed transmission 12' and its motor. These units may be controlled, respectively, by push button contacts 235 and 236 on the housing 77 of the pistol grip control (FIG. 6). Additionally, supporting members 237 and 238 may be attached to housing 77 for engaging mating elements within a rack for supporting the control when not in use.

Although the various features of the transmission and control therefor have been shown and described in detail to fully disclose one embodiment of the invention, it will be evident that changes may be made in such details and certain features may be used without others without departing from the principles of the invention.

What is claimed is:

1. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a variable speed control transmission driven by said table-rotating transmission; an epicyclic gearing train between the output of said control transmission and the output of said steplessly variable speed transmission for moving the cam of said servomechanism; means adapted to preset said control variable speed transmission for causing said servomechanism to adjust said hydraulic transmission; a control adapted to be carried in one hand of an operator and including a pistol grip; a trigger mounted in said control and located in a neutral position relatively to said pistol grip to be operable by the index finger of the hand holding said control; means rendered effective when said trigger is on one side of its neutral position for causing said member to be moved at a rate depending upon the preset adjustment of said control transmission; and means rendered effective when said trigger is on the other side of its neutral position for causing said member to move at a rate depending upon the position of said trigger and independent of said control transmission.

2. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a variable speed control transmission driven by said table-rotating transmission; an epicyclic gearing train between the output of said control transmission and the output of said steplessly variable speed transmission for moving the cam of said servomechanism; means adapted to preset said control variable speed transmission for causing said servomechanism to adjust said hydraulic transmission; a control adapted to be carried in one hand of an operator and including a pistol grip; a trigger mounted in said control and located in a neutral position relatively to said pistol grip to be operable by the index finger of the hand holding said control; means rendered effective when said trigger is on one side of its neutral position for causing said member to be moved at a rate depending upon the preset adjustment of said control transmission; and means rendered effective when said trigger is on the other side of its neutral position for causing said member to move at a rate depending upon the position of said trigger and independent of said control transmission; and push button means on said control in position relatively to said pistol grip to be operated by the thumb of the hand holding said grip for determining the path and direction of movement of said member.

3. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a reciprocable shaft for adjusting said hydraulic transmission; a cam; a servo valve between said cam and reciprocable shaft; a variable speed control transmission driven by said table-rotating transmission; an epicyclic gearing train connected to the output of said control transmission and to the output of said steplessly variable speed transmission for moving said cam; means adapted to preset said control variable speed transmission for causing said cam to operate said servo valve to thereby adjust said hydraulic transmission; a control adapted to be carried in one hand of an operator and including a pistol grip; a trigger mounted in said control and located in a neutral position relatively to said pistol grip to be operable by the index finger of the hand holding said control; means rendered effective when said trigger is on one side of its neutral position for causing said member to be moved at a rate depending upon the preset adjustment of said control transmission; means rendered effective when said trigger is on the other side of its neutral position for causing said member to move at a rate depending upon the position of said trigger and independent of said control transmission; and push button means on said control in position relatively to said pistol grip to be operated by the thumb of the hand holding said grip for determining the path and direction of movement of said member.

4. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a reciprocable shaft for adjusting said hydraulic transmission; a cam; a pivotally mounted servo valve having a roller in contact with said cam and a valve stem in contact with the one end of said reciprocable shaft; a variable speed control transmission driven by said table-rotating transmission; an epicyclic gearing train connected to the output of said control transmission and to the output of said steplessly variable speed transmission for moving said cam; means adapted to preset said control variable speed transmission for causing said cam to operate said servo valve to thereby adjust said hydraulic transmission; a control adapted to be carried in one hand of an operator and including a pistol grip; a trigger mounted in said control and located in a neutral position relatively to said pistol grip to be operable by the index finger of the hand holding said control; means rendered effective when said trigger is on one side of its neutral position for causing said member to be moved at a rate depending upon the preset adjustment of said control transmission; means rendered effective when said trigger is on the other side of its neutral position for causing said member to move at a rate depending upon the position of said trigger and independent of said control transmission; and push button means on said control in position relatively to said pistol grip to be operated by the thumb of the hand holding said grip for determining the path and direction of movement of said member.

5. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a first servomechanism for adjusting said hydraulic transmission, including a reciprocable cam; a variable speed control transmission driven by said table-rotating transmission; a separate servomechanism between the output of said control transmission and the output of said steplessly variable speed transmission for moving the cam of said first-mentioned servomechanism; means adapted to preset said control variable speed transmission for causing said first-mentioned servomechanism to adjust said hydraulic transmission; a control adapted to be carried in one hand of an operator and including a pistol grip; a trigger mounted in said control and located in a neutral position relatively to said pistol grip to be operable by the index finger of the hand holding said control; means rendered effective when said trigger is on one side of its neutral position for causing said member to be moved at a rate depending upon the preset adjustment of said control transmission; means rendered effective when said trigger is on the other side of its neutral position for causing said member to move at a rate depending upon the position of said trigger and independent of said control transmission; and push button means on said control in position relatively to said pistol grip to be operated by the thumb of the hand holding said grip for determining the path and direction of movement of said member.

6. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; a control adapted to be carried in one hand of an operator and including a pistol grip; a trigger mounted in said control and located in a neutral position relatively to said pistol grip to be operable by the index finger of the hand holding said control; and means rendered effective when said trigger is moved from its neutral position for moving said cam to actuate said servomechanism to thereby cause said member to be moved at a rate depending upon the position of said trigger.

7. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; a control adapted to be carried in one hand of an operator and including a pistol grip; a trigger mounted in said control and located in a neutral position relatively to said pistol grip to be operable by the index finger of the hand holding said control; means rendered effective when said trigger is moved from its neutral position for moving said cam to actuate said servomechanism to thereby cause said member to be moved at a rate depending upon the position of said trigger; and means for increasing the resistance to the movement of said trigger the farther it is moved from said neutral position.

8. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; a control adapted to be carried in one hand of an operator and including a pistol grip; a trigger mounted in said control and located in a neutral position relatively to said pistol grip to be operable by the index finger of the hand holding said control; means rendered effective when said trigger is moved from its neutral position for moving said cam to actuate said servomechanism to thereby cause said member to be moved at a rate depending upon the position of said trigger; push button means on said control in position relatively to said pistol grip to be operated by the thumb of the hand holding said grip for determining the path and direction of movement of said member; and interlocking means responsive to the movement of said trigger for preventing the selection of, or direction along a path of movement of said member when said trigger is displaced from its neutral position.

9. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; a control adapted to be carried in one hand of an operator and including a pistol grip; a trigger mounted in said control and located in a neutral position relatively to said pistol grip to be operable by the index finger of the hand holding said control; means rendered effective when said trigger is moved from its neutral position for moving said cam to actuate said servomechanism to thereby cause said member to be moved at a rate depending upon the position of said trigger; means for increasing the resistance to the movement of said trigger the farther it is moved from said neutral position; push button ing; a cam shaft in said housing; a connection between said cam shaft and trigger for causing said cam shaft to rotate in opposite directions when said trigger is moved to either side of a neutral position; cams on said cam shaft; a switch mounted within said housing and operable by one of said cams when said trigger is moved in one direction from said neutral position for causing said member to move at a preselected feed rate; a plurality of other switches within said housing, successively rendered effective by other of said cams when said trigger is moved to successive positions on the other side of said neutral position for causing said member to move at successively increasing traverse rates; and a single plate operable by said trigger for interlocking said contact actuators to prevent their actuation when said trigger is displaced on either side of its neutral position.

17. In a control for transmission for moving a member in either direction along intersecting paths comprising in combination, a box-like housing having a pistol grip adapted to be held in one hand of an operator; a series of contact actuators arranged in a circle in a location on said housing such that the thumb of the hand holding said grip can with facility actuate any one or two adjacent of said contact actuators; solenoid valves for controlling the movement of said member adapted to be rendered effective by the actuation of said contact actuators; a trigger adjacent said grip and extending into said housing; a cam shaft in said housing; a connection between said cam shaft and trigger for causing said cam shaft to rotate in opposite directions when said trigger is moved to either side of a neutral position; cams on said cam shaft; a switch mounted within said housing and operable by one of said cams when said trigger is moved in one direction from said neutral position for causing said member to move at a preselected feed rate; a plurality of other switches within said housing, successively rendered effective by other of said cams when said trgger is moved to successive positions on the other side of said neutral position for causing said member to move at successively increasing traverse rates; and a lever on said housing, connected to said trigger for operating said cam shaft independently of said trigger.

18. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a reversible electric motor for reciprocating said cam; a variable speed control transmission driven by said table-rotating transmission; an epicyclic gearing train between the output of said control transmission and the output of said steplessly variable speed transmission for moving the cam of said servomechanism; means adapted to preset said control variable speed transmission for causing said servomechanism to adjust said hydraulic transmission; a control adapted to be carried in one hand of an operator and including a pistol grip; a trigger mounted in said control and located in a neutral position relatively to said pistol grip to be operable by the index finger of the hand holding said control; a cam shaft within said control; a connection between said cam shaft and trigger for causing said cam shaft to rotate in opposite directions when said trigger is moved to either side of a neutral position; cams on said cam shaft; a switch mounted within said control and operable by one of the cams on said cam shaft when said trigger is moved in one direction from said neutral position to cause said member to move at the rate preset by said control variable speed transmission; and a plurality of other switches within said control successively rendered effective by other cams on said cam shaft when said trigger is moved to the other side of said neutral position for energizing said reversible electric motor for moving said reciprocable cam to effect successive increases in the speed of said member.

19. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; a control adapted to be carried in one hand of an operator and including a pistol grip; a trigger mounted in said control and located in a neutral position relatively to said pistol grip to be operable by the index finger of the hand holding said control; a cam shaft within said control; a connection between said cam shaft and trigger for causing said cam shaft to turn when said trigger is moved to one side of a neutral position; cams on said cam shaft; switches within said control adapted successively to be actuated when said trigger is moved to successive positions away from said neutral position; and means rendered effective by the successive actuation of said switches to cause said member to be moved at a rate depending upon the position of said trigger.

20. In an apparatus including a member adapted to be moved in either direction along intersecting paths of motion, a rotatable table; a variable speed transmission for rotating said table, separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; a control adapted to be carried in one hand of an operator and including a pistol grip; a trigger mounted in said control and located in a neutral position relatively to said pistol grip to be operable by the index finger of the hand holding said control; a cam shaft within said control; a connection between said cam shaft and trigger for causing said cam shaft to turn when said trigger is moved to one side of a neutral position; cams on said cam shaft; switches within said control adapted successively to be actuated when said trigger is moved to successive positions away from said neutral position; means rendered effective by the successive actuation of said switches to cause said member to be moved at a rate depending upon the position of said trigger; and means for increasing the resistance to the movement of said trigger the farther it is moved from said neutral position.

21. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; means normally urging said cam in one direction; a control adapted to be carried in one hand of an operator and including a pistol grip; a trigger mounted in said control and located in a neutral position relatively to said pistol grip to be operable by the index finger of the hand holding said control; a cam shaft within said control; a connection between said cam shaft and trigger for causing said cam shaft to turn when said trigger is moved to one side of a neutral position; cams on said cam shaft; switches with-means on said control in position relatively to said pistol grip to be operated by the thumb of the hand holding said grip for determining the path and direction of movement of said member; and interlocking means responsive to the movement of said trigger for preventing the selection of, or direction along a path of movement of said member when said trigger is displaced from its neutral position.

10. In an apparatus including a member adapted to be moved in either direction along intersecting paths of motion, a rotatable table; a variable speed transmission for rotating said table; separate rotatable shafts for effecting the movement of said member; reversing gearing for causing said shafts to rotate in opposite directions; a steplessly variable speed transmission for driving said reversing gearing, including a steplessly variable hydraulic transmission; a servomechanism for adjusting said hydraulic transmission, including a reciprocable cam; a variable speed control transmission driven by said table-rotating transmission; an epicyclic gearing train between the output of said steplessly variable speed transmission and said variable speed control transmission for moving the cam of said servomechanism, said train including a clutch; means adapted to preset said control variable speed transmission for causing said servomechanism to adjust said hydraulic transmission; means normally urging said cam in one direction; a control adapted to be carried in one hand of an operator and including a pistol grip; a trigger mounted in said control and located in a neutral position relatively to said pistol grip to be operable by the index finger of the hand holding said control; and means rendered effective when said trigger is on one side of its neutral position for rendering said clutch effective to cause said member to be moved at a rate depending upon the preset adjustment of said control transmission.

11. In an apparatus including a member adapted to be moved in either direction along intersecting paths of motion, a rotatable table; a variable speed transmission for rotating said table; separate variable speed transmission means for moving said member along a selected path and at a selected speed; a control adapted to be carried in one hand of an operator and including a pistol grip; a trigger mounted in said control and located in a neutral position relatively to said pistol grip to be operable by the index finger of the hand holding said control; means rendered effective when said trigger is on one side of its neutral position for causing said member to be moved at a rate depending upon the preset adjustment of said control transmission; and means rendered effective when said trigger is on the other side of its neutral position for causing said member to move at a rate depending upon the position of said trigger.

12. In a control for a variable speed transmission having a solenoid operated valve for causing said transmission to rotate at a predetermined feed rate of speed and a plurality of circuit makers which when energized cause said transmission to rotate at predetermined traverse rates of speed, a housing; a pistol grip attached to said housing; a trigger extending from a point adjacent the pistol grip into said housing; a cam shaft in said housing and operable by movement of said trigger; cams on said shaft; and electrical switches within said housing, said cams being arranged so that movement of said trigger to one side of a neutral position effects the energizing of said feed solenoid, and movement of said trigger to the opposite side of said neutral position successively energizes said plurality of circuit makers for causing said transmission to rotate at said predetermined traverse rates of speed.

13. In a control for a transmission for moving a member in either direction along intersecting paths at a predetermined feed rate and at a plurality of different traverse rates comprising in combination, a box-like housing having a pistol grip adapted to be held in one hand of an operator; a trigger adjacent said grip and extending into said housing; a cam shaft in said housing; a connection between said cam shaft and trigger for causing said cam shaft to rotate in opposite directions when said trigger is moved to either side of a neutral position; cams on said cam shaft; a switch mounted within said housing and operable by one of said cams when said trigger is moved in one direction from said neutral position for causing said member to move at a preselected feed rate; and a plurality of other switches within said housing, successively rendered effective by other of said cams when said trigger is moved to successive positions on the other side of said neutral position for causing said member to move at successively increasing traverse rates.

14. In a control for a transmission for moving a member in either direction along intersecting paths comprising in combination, a box-like housing having a piston grip adapted to be held in one hand of an operator; a series of contact actuators arranged in a circle in a location on said housing such that the thumb of the hand holding said grip can with facility actuate any one or two adjacent of said contact actuators; solenoid valves for controlling the movement of said member adapted to be rendered effective by the actuation of said contact actuators; a trigger adjacent said grip and extending into said housing; a cam shaft in said housing; a connection between said cam shaft and trigger for causing said cam shaft to rotate in opposite directions when said trigger is moved to either side of a neutral position; cams on said cam shaft; a switch mounted within said housing and operable by one of said cams when said trigger is moved in one direction from said neutral position for causing said member to move at a preselected feed rate; and a plurality of other switches within said housing, successively rendered effective by other of said cams when said trigger is moved to successive positions on the other side of said neutral position for causing said member to move at successively increasing traverse rates.

15. In a control for a transmission for moving a member in either direction along intersecting paths comprising in combination, a box-like housing having a pistol grip adapted to be held in one hand of an operator; a series of contact actuators arranged in a circle in a location on said housing such that the thumb of the hand holding said grip can with facility actuate any one or two adjacent of said contact actuators; solenoid valves for controlling the movement of said member adapted to be rendered effective by the actuation of said contact actuators; a trigger adjacent said grip and extending into said housing; a cam shaft in said housing; a connection between said cam shaft and trigger for causing said cam shaft to rotate in opposite directions when said trigger is moved to either side of a neutral position; cams on said cam shaft; a switch mounted within said housing and operable by one of said cams when said trigger is moved in one direction from said neutral position for causing said member to move at a preselected feed rate; a plurality of other switches within said housing, successively rendered effective by other of said cams when said trigger is moved to successive positions on the other side of said neutral position for causing said member to move at successively increasing traverse rates; and means cooperable with said circularly arranged contact actuators and said trigger for preventing the actuation of said contacts when said trigger is displaced on either side of its neutral position.

16. In a control for a transmission for a moving member in either direction along intersecting paths comprising in combination, a box-like housing having a pistol grip adapted to be held in one hand of an operator; a series of contact actuators arranged in a circle in a location on said housing such that the thumb of the hand holding said grip can with facility actuate any one or two adjacent of said contact actuators; solenoid valves for controlling the movement of said member adapted to be rendered effective by actuation of said contact actuators; a trigger adjacent said grip and extending into said housin said control adapted successively to be actuated when said trigger is moved to successive positions away from said neutral position; means rendered effective by the successive actuation of said switches to cause said member to be moved at a rate depending upon the position of said trigger; push button means on said control in position relatively to said pistol grip to be operated by the thumb of the hand holding said grip for determining the path and direction of movement of said member; and interlocking means responsive to the movement of said trigger for preventing the selection of, or direction along, a path of movement of said member when said trigger is displaced from its neutral position.

References Cited in the file of this patent

UNITED STATES PATENTS

| | | |
|---|---|---|
| 2,144,665 | Rasmussen | Jan. 24, 1939 |
| 2,352,183 | Bullard | June 27, 1944 |
| 2,384,809 | Bullard | Sept. 18, 1945 |
| 2,812,405 | Wolkov | Nov. 5, 1957 |
| 2,831,361 | Hollis | Apr. 22, 1958 |